Patented Nov. 3, 1942

2,300,812

UNITED STATES PATENT OFFICE 2,300,812

ACID-RESISTANT CEMENTING COMPOSITION

John B. Rust, Verona, N. J., assignor, by mesne assignments, to Montclair Research Corporation, Montclair, N. J., a corporation of New Jersey No Drawing. Application September 5, 1941, Serial No. 409,661

6 Claims. (Cl. 260—41)

This invention relates to compositions comprising a liquid binding agent, a pulverulent mineral filling material and a strong acid hardening agent; such compositions being of a paste or putty-like consistency and useful as cementing agents, mortars, plasters, molding compositions, etc. In particular the invention relates to cementing compositions suitable for use under extreme conditions of exposure such as acidproof cements.

It is an object of this invention to prepare self-hardening compositions, such compositions being initially of a soft and easily workable consistency. A particular object is the provision of self-hardening cementing compositions which may be used where corrosion is a major problem. Other objects will be apparent from the description which follows.

Furfuryl alcohol is known to resinify in contact with acids. This reaction may become very violent if too much strong acid is used. On the other hand, the reaction is very slow if only a small amount of acid is present. Thus, to control the resinification of furfuryl alcohol the acidity must be carefully adjusted. However, furfuryl alcohol is volatile (boiling point 170° C.) and when acid is added in such amount that the resinification is slow and uniform, much of the alcohol may be lost before resinification to a stage of non-volatility occurs. This, of course, applies to those conditions where much surface is exposed as in cementing applications.

I have found that furfuryl silicates resinify very rapidly. Being of much higher boiling point than furfuryl alcohol their hardening may be controlled by addition of small amounts of acid and at the same time no loss due to volatilization before resinification occurs. Although organic silicates, particularly alkyl silicates, are known to hydrolyze rather rapidly, partial hydrolysis of the hardened binder in the present case is of no consequence since the hydrolytic products are resinified furfuryl alcohol and silicic acid, both of which become useful ingredients of the final hardened mass. Hardened furfuryl silicates are more resistant to acids than resinified furfuryl alcohol. Furthermore, furfuryl silicates are stable in consistency over long periods in the absence of acids.

Furfuryl orthosilicate is an example of liquid constituting a component of the binding agent in the present invention. This substance is conveniently prepared by heating furfuryl alcohol and ethyl orthosilicate (boiling point 165° C.) at a temperature high enough to remove ethyl alcohol but not high enough as to distil ethyl silicate or furfuryl alcohol. The silicic ester does not need to be pure; the crude product from reacting furfuryl alcohol and ethyl silicate may be used. This may contain unreacted furfuryl alcohol. Also, in many cases the product from the reaction of furfuryl alcohol with crude preparations of ethyl silicate or with tailings of the preparation of ethyl orthosilicate by reaction of ethyl alcohol and silicon tetrachloride is satisfactory. Alkyl silicates other than ethyl silicate may be used in preparing furfuryl silicate provided the alcohol of which it is composed is of greater volatility than furfuryl alcohol. Furfuryl orthosilicate may be purified by distillation if desired although this is not usually justified since the distillate is not color-stable; the originally water-white liquid rather rapidly turns green and subsequently dark brown.

Besides furfuryl orthosilicate, other furfuryl silicates may be mentioned such as mixed esters of silicic acid with furfuryl alcohol and another alcohol or phenol. Ethyl silicate in which some of the ethyl groups are replaced by furfuryl groups (obtained by use of an excess of ethyl silicate) is an example. Also, esters prepared by reacting ethyl silicate with a mixture of furfuryl alcohol and another alcohol or phenol of higher boiling point than ethyl alcohol (e. g., diphenylol propane).

Furfuryl silicate being a mobile liquid, it is desirable to add a soluble substance to increase its viscosity. The added substance is one that does not hinder resinification and does not detract from the properties desired in the final composition. Resins soluble in furfuryl silicates are therefore advantageous ingredients of the composition. The importance of relatively high viscosity in the binder herein is understandable when a composition is applied to a porous surface such as brickwork. If the binder is too liquid it will be sucked into the pores of the brickwork and leave relatively dry filling material on the surface which tends to disintegrate. Resins suitable for increasing viscosity include those which are soluble in furfuryl silicates. They are preferably chemically resistant although, if the use to which the cement is put makes extreme resistance immaterial, they may include a wide range of resins and plastics which otherwise would not be considered, such as cellulose esters and ethers. The resins preferred herein are acid-resistant and include coumarone resins and phenol-aldehyde resins. A particularly useful resin is the residue from wood rosin manufacture constituting the gasoline-insoluble portion of the wood extract. This material is sold under the name of Vinsol. Resins may be dissolved in the furfuryl silicate or a relatively concentrated solution of the resin in furfuryl alcohol may be added.

A hardening agent for the liquid binder is required. This is a strong acid substance soluble in furfuryl silicate and is provided in such amount that hardening occurs gradually and uniformly after it has been added. The hardening agent is introduced to the furfuryl silicate just before the composition is used so that hardening occurs after the cement is in place. Suitable acids and acid salts include sulfuric acid, hydrochloric acid, phosphoric acid, sulfamic acid, toluenesulfonyl chloride, titanium sulfate and aluminum chloride. The acid substance is usually dry or solid and capable of being mixed with pulverulent mineral fillers to form a powdered mixture, as will be more fully pointed out later. Toluenesulfonic acid is a particularly satisfactory hardening agent. The amount of acid depends principally upon its strength. In a composition containing a furfuryl silicate and a filler it has been found that about 3% of p-toluenesulfonic acid based on the binder is a desirable amount. In a similar composition about 5% of sulfamic acid is suitable. For more rapid set-up the acid is increased and to slow down the cure the amount is decreased.

Fillers are pulverulent substances designed to stiffen the mixture and yield bulk, etc. The particular kind of filler depends on the ultimate use of the composition. For acid-resistance, powdered silica (silex), diatomaceous earth, carbon black, acid-washed clays, mica and the like are useful. For uses where extreme acid-resistance is not required other fillers may be acceptable such as powdered gypsum, barytes and wood flour. The amount of filling material is adjusted to the consistency desired in the composition. Using silex and furfuryl silicate, 8 parts of filler and 3 parts of binder are suitable proportions. The binders of the present invention are generally of a relatively dark color. Also during hardening the color darkens so that the final hardened binder is dark brown or black. Consequently the addition of pigments to produce light shades is not feasible.

Since the compositions of the present invention are hardened by adding the acid material just before use, the materials are marketed unmixed. Preferably the acid and filler are prepared as an intimate mixture and packaged in a dry powdered form. The binder is furnished as a liquid. The two materials are stable over long periods and are mixed in prescribed proportions at the time the composition is to be used.

The following examples illustrate the invention but are not to be considered as limiting since various modifications will occur to those skilled in the art.

Compositions were prepared in which the amount of binding liquid, filler, and hardening agent were constant.

| | Parts by weight |
|---|---|
| Binder | 7.5 |
| Silex | 20.0 |
| p-Toluenesulfonic acid | 0.25 |

The acid was ground with the filler and the powdered mixture was stirred into the binding liquid until a homogeneous mass was formed. The following binding liquids were used in the cementing compositions.

I. *Furfuryl silicate.*—A mixture of 90 parts of ethyl orthosilicate and 170 parts of furfuryl alcohol was heated under a short air condenser at 145°–150° C. for 6 hours. During this time ethyl alcohol which was formed distilled off leaving a dark brown slightly viscous liquid. Mixed with filler and acid, the composition remained workable for about an hour. After 16 hours it was hard. Sulfuric acid of 50% concentration showed no effect whatever during two weeks contact.

A similar composition in which furfuryl alcohol was used as binder was slightly softer than the above after 16 hours. Also when a piece of the hardened composition was immersed in 50% sulfuric acid for two weeks the acid took on a slightly yellow color, indicating a slight action.

II. *Distilled furfuryl silicate.*—The binding liquid of I. was distilled under vacuum to obtain a light greenish high-boiling liquid. On standing the color deepened to a dark brown. A cementing composition prepared from the liquid was similar to I.

III. *Furfuryl silicate prepared from crude ethyl silicate.*—A dark brown silicate comprising a crude reaction product of ethyl alcohol and silicon tetrachloride was substituted for the orthosilicate of I. The product was very dark colored and somewhat more viscous than I. Set-up time and acid-resistance of the hardened composition compared favorably with I.

IV. *Mixture of furfuryl alcohol and furfuryl silicate.*—Equal parts of these liquids were used as binding liquid. Hardening was good and 50% sulfuric acid in which a piece of the hardened cement was soaked for two weeks showed a barely perceptible yellow color.

V. *Solution of Vinsol in furfuryl silicate.*—A mixture of 2 parts silicate and 1 part resin was prepared. A cementing composition prepared from this binder compared very closely with I. Vinsol is the trade-name for a gasoline-insoluble resin extracted from pine wood and described by Lucius C. Hall in United States Letters Patent 2,193,026, Mar. 12, 1940.

VI. *Solution of coumarone resin in furfuryl silicate.*—A solution of 1 part Cumar VI in furfuryl silicate was used as binding liquid in a cementing composition. After 16 hours the mass was hard but could be dented by thumb-nail. After two weeks soaking in 50% sulfuric acid the acid became slightly yellow.

VII. *Diphenylolpropane-furfuryl silicate.*—A mixture of 115 parts diphenylolpropane, 48.6 parts ethyl orthosilicate and 45.4 parts furfuryl alcohol was distilled from a flask heated by an oil-bath at 135–145° C. for 5 hours or until ethyl alcohol ceased to distil over. The product was a dark-colored, viscous syrup. A cementing composition prepared with this material as binding agent was hard after 24 hours and very tough. Acid resistance was very good.

VIII. *Solution of a phenol-aldehyde resin in furfuryl silicate.*—Phenol-acetaldehyde resin (1 part) was dissolved in furfuryl silicate (2 parts). The cementing composition prepared from this binder was very hard after 24 hours. No color was imparted to 50% sulfuric acid and no softening occurred when the hardened mass was soaked for two weeks.

IX. *Solution containing a phenol-aldehyde resin, furfuryl alcohol and furfuryl silicate.*—A mixture of 122 parts mixed xylenols, 122 parts of 37.5% aqueous formaldehyde, 0.5 part sodium carbonate and 140 parts furfuryl alcohol was heated under reflux at 65°-70° C. for 4 hours, after which water was removed by distillation under reduced pressure. The product was a clear, viscous syrup which was thinned with an equal amount of furfuryl silicate and used as binding liquid in a cementing composition. The composition hardened in 24 hours and the cured mass was not affected by 50% sulfuric acid during two weeks.

X. *Solution of Vinsol in furfuryl alcohol (for comparison).*—One part of Vinsol and 2 parts of furfuryl alcohol used as binding agent in a cement produced a mass which was not quite as hard as V after 16 hours. A slight color was imparted to 50% sulfuric acid during two weeks by the hardened mass. Vinsol is the trade name of a resin as described in V.

In the above formulas the proportions of binding liquid, filler and hardening agent are constant. Since the viscosity of the different binding liquids varies, the amount of filler would be changed if the consistency of all compositions had to be kept constant.

What I claim is:

1. A cementing composition comprising a furfuryl silicate, a pulverulent filler and a strong acid hardening agent.

2. A cementing composition comprising furfuryl ortho-silicate, a pulverulent filler and a strong acid hardening agent.

3. A cementing composition comprising a furfuryl silicate, a pulverulent filler and p-toluenesulfonic acid.

4. A cementing composition comprising a furfuryl silicate, an acid-proof resin soluble therein, a pulverulent filler and a strong acid hardening agent.

5. A cementing composition comprising binding liquid, mineral filling material and a strong acid hardening agent for the binding liquid, said binding liquid comprising a furfuryl silicate.

6. An acid-proof cement comprising a furfuryl silicate, powdered silica and p-toluenesulfonic acid.

JOHN B. RUST.